Fig. 1.

INVENTOR
William R. Wickerham.
BY
Paul E. Frielemann
ATTORNEY

Oct. 9, 1945.  W. R. WICKERHAM  2,386,581
HOIST CONTROL SYSTEM
Filed Dec. 8, 1943   4 Sheets-Sheet 2

Fig.2.

| Controller | Position | Contactor |||||||||||||||||||||||||||||||||
|---|---|---|---|---|---|---|---|---|---|---|---|---|---|---|---|---|---|---|---|---|---|---|---|---|---|---|---|---|---|---|---|---|---|---|
| | | R1 ||| R2 ||| R3 | R4 || R5 |||||| R6 ||| R7 |||| R8 ||| R9 ||| R0 ||| T1 | T2 | T3 |
| | | 1/1 | 2/1 | 3/1 | 1/2 | 2/2 | 3/2 | 3/3 | 1/4 | 2/4 | 1/5 | 2/5 | 3/5 | 4/5 | 5/5 | 6/5 | 1/6 | 2/6 | 3/6 | 1/7 | 2/7 | 3/7 | 4/7 | 5/7 | 1/8 | 2/8 | 3/8 | 4/8 | 1/9 | 2/9 | 3/9 | 4/9 | 1/20 | 2/20 | 3/20 | 101 | 102 | 103 |

O = Contact Closed, Contactor Coil Energized.
⊗ = Contact Closed, Contactor Coil De-energized.

WITNESSES:
Alice L. Howell
Curt M. Avery

INVENTOR
William R. Wickerham.
BY
Paul E. Friedemann
ATTORNEY

Oct. 9, 1945.   W. R. WICKERHAM   2,386,581
HOIST CONTROL SYSTEM
Filed Dec. 8, 1943   4 Sheets-Sheet 4

WITNESSES:

INVENTOR
William R. Wickerham.
BY
Paul E. Friedemann
ATTORNEY

Patented Oct. 9, 1945

2,386,581

UNITED STATES PATENT OFFICE 2,386,581

HOIST CONTROL SYSTEM

William R. Wickerham, Swissvale, Pa., assignor to Westinghouse Electric Corporation, East Pittsburgh, Pa., a corporation of Pennsylvania Application December 8, 1943, Serial No. 513,352

23 Claims. (Cl. 172—152)

My invention relates to control systems for alternating-current hoist motors as used on cranes, mine hoists, and other hoisting or elevating devices, and has the general object of improving the torque conditions of the hoist motor for deceleration in the lowering direction or for lowering overhauling loads at reduced speeds.

Three methods of controlling the speed of alternating-current hoist motors during lowering or retardation are in use at the present time:

1. Alternating-current—excited dynamic braking,
2. Direct-current—excited dynamic braking, and
3. The so-called countertorque operation.

Each of these methods has characteristic advantages and shortcomings as compared with the two others, none of them being satisfactory in all essential respects. Alternating-current excited dynamic braking requires relatively simple operating means but provides a rather limited torque, for instance of about 100% at 70% speed, and draws an excessive input current of about 200% to 300% normal in two of the three lines of the supply system. Direct-current excited braking requires an additional direct-current exciter set or rectifying equipment but affords a better speed control, the current input being about 150% normal to obtain a practical braking torque of 150% normal. The countertorque method is superior to the dynamic braking methods in permitting an unlimited torque up to the pull out limit, but entails an unstable speed control due to the fact that there is little change in torque with change in speed, and has also the drawback that the motor will reverse its rotation when zero speed is reached unless special means are used for removing the motor from the line in that moment.

It is a more specific object of my invention to provide a hoist motor control which affords a high torque similar to that of the countertorque method when lowering at high speed without incurring the instability of speed control and the tendency to reverse the motor rotation inherent in the countertorque method.

In another aspect, my invention aims at providing a hoist control system which offers the advantage of a vanishing or greatly reduced torque at low lowering or zero speed, similar to the characteristic of the alternating-current and direct-current excited braking methods, while affording a much higher torque than these methods when lowering at high operating speeds.

Another object, allied to the foregoing, is to combine in a hoist control system the favorable low-speed torque characteristics of the abovementioned braking methods with the high-speed torque characteristics of countertorque lowering operation while maintaining the current input in moderate limits comparable to those of alternating-current excited braking performance.

Still another object, also related to those abovestated, is to provide a hoist control of unlimited torque up to pull-out torque when lowering at high speed and vanishing torque at zero speed in conjunction with a stable and reliable speed control.

In order to achieve these objects, and in accordance with an essential feature of my invention, a hoist control system is equipped with a multiphase energizing circuit and contains variable circuit means which are asymmetrically arranged or asymmetrically adjustable relative to the phases of the circuit so as to permit selectively a variation of the relative voltage distribution of the primary motor windings through a range which includes a substantially balanced multiphase energization for obtaining a multiphase speed torque characteristic, and a highly unbalanced energization for obtaining a low speed low torque characteristic especially when lowering at light load or empty hook. In a specific aspect of the invention, the selectively variable circuit means for controlling the voltage balance condition consist of controllable impedance, preferably inductance, means which are connected with a limited number of phases of the energizing circuit and controlled so as to run the motor substantially in single phase operation at low retarding speeds or overhauling loads, while permitting a multiphase operation at high lowering speeds.

According to another feature of my invention, the variable impedance for effecting the justmentioned control consists of a saturable reactor whose reactance winding, now referring especially to three phase lines, is inserted in one phase of the line and whose control or premagnetizing winding is energized in dependence upon the controller adjustment or speed of the hoist motor so as to increase the effective reactance with decreasing lowering speeds.

In control systems of this type, torques of greater magnitude than obtainable by the known braking operation are provided by the fact that the motor approaches ordinary multiphase characteristic at the higher lowering speeds, while a dynamic braking performance is imitated by causing the motor to assume single-phase characteristic as the speed approaches zero.

The above-mentioned and other objects and features of my invention will become apparent from the following description of the embodiment represented by the drawings, in which:

Figs. 3, 4 and 5 are different torque-speed diagrams for elucidating the operation of the same system; while

Figure 1:
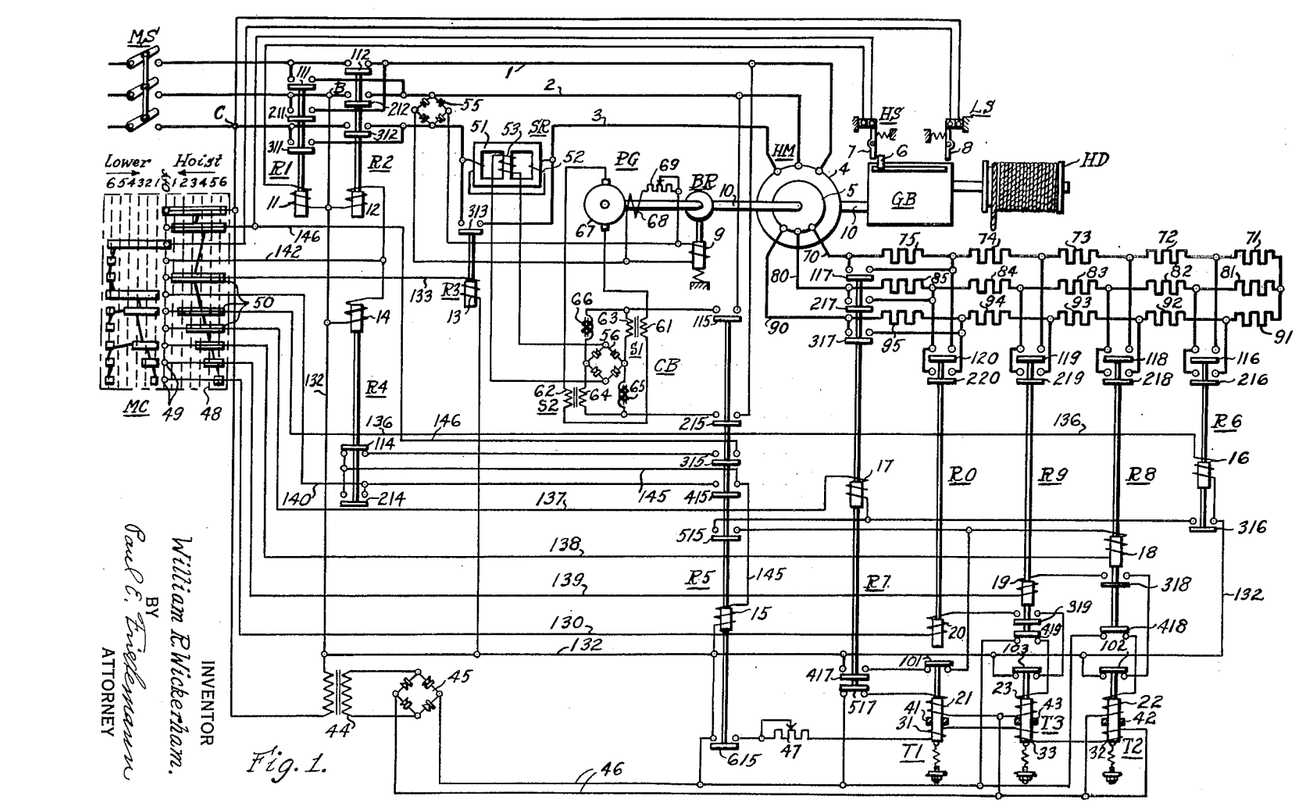
Figure 1 is a diagrammatic showing of a complete hoist control system according to the invention.

Referring to Fig. 1, the hoist motor to be controlled is designated by HM. It is energized from mains 1, 2 and 3 connected to the line through a master switch MS. The motor is of the wound rotor type and has the external circuit 70, 80, 90 of its rotor 5 provided with resistors 71 through 75, 81 through 85, and 91 through 95, respectively. The motor is connected by a drive shaft 10 and through a gear box GB with the hoisting drum HD. A travelling nut 6 actuated by the gear box is provided to cooperate in either end position with the movable contact members 7 of a hoist limit switch HS or the corresponding contact member 8 of a lower limit switch LS. The shaft 10 carries also the drum of an electromagnetically actuated brake BR whose operating coil is denoted by 9. The armature 67 of a pilot generator PG is also mounted on, or geared to shaft 10 for generating a pilot voltage in proportion to the motor speed. The field winding 68 of the pilot generator is energized through an adjusting rheostat 69 from a rectifier bridge 55 fed from mains 2 and 3. The bridge 55 serves also to energize the brake coil 9. Rheostat 69 remains fixed during the operation of the system so that field winding 68 is excited by a constant voltage. The braking effect produced by brake BR remains likewise constant at an adjusted value.

A hoist relay R1 having a control coil 11 and three contacts 111, 211 and 311 serves to connect the field 4 of the hoist motor HM to the line in such a way as to operate the motor in the hoisting direction. A similar lowering relay R2, having a control coil 12 and three contacts 112, 212 and 312, serves to operate the motor in the lowering direction.

The main 3 contains in series-connection the alternating-current coil 52 of a saturable reactor SR whose magnetizable core 51 is provided with a premagnetizing control coil 53 for varying the magnetization of the core and thereby the reactance effective in coil 52. The range of controllable reactance is so chosen that the minimum reactance of SR, prevailing when coil 53 is energized for saturation of core 51, impedes the flow of current through conductor 3 sufficiently little to energize the motor substantially in three-phase operation, while the effective reactance is sufficiently high for enforcing approximate single-phase operation of the motor when control coil 53 is deenergized and the reactor core 51 unsaturated. As apparent from Fig. 1, the coil 52 is subdivided and has its parts so arranged on core 51 that the transformer effect on coil 53 is negligible.

A relay R3 is provided to short circuit the reactor by means of relay contact 313 in order to establish a full three-phase energization operation of motor HM in certain stages of operation. R4 is an auxiliary relay for controlling the hoisting relay R1 and has two contacts 114 and 214 actuated by a relay coil 14 which is connected in parallel to coil 12 of the lowering relay R2, and hence operates together with the latter relay.

A relay R5 for controlling the energization of the reactor control coil 53 has six contacts 115, 215, 315, 415, 515 and 615 actuated by a relay coil 15. Contact 415 serves to establish a self-sealing connection as will be apparent from the following, while contacts 115 and 215 connect a control bridge CB to mains 1 and 2 when relay R5 is energized. The control bridge CB contains four impedance devices, here shown as reactors and denoted by 63, 64, 65 and 66, which are arranged in four different bridge branches. The diagonal branch of the arrangement CB contains a rectifier bridge 56 whose direct-current output circuit is connected to the reactor coil 53. When the control bridge CB is energized from mains 1 and 2, the voltage of the direct-current current supplied to coil 53 depends on the adjustment of the four bridge impedances. Two of them, namely reactors 65 and 66, are constant while reactors 63 and 64 are variable. The variation is produced and controlled by the coils 61 and 62, respectively. That is, device S1 is a saturable reactor, so that the reactance of coil 63 is controlled by the energization of coil 61. In the latter case, device S2 is also designed as a similarly operating saturable reactor.

The essential feature of the control arrangement CB and its connection with the pilot generator PG and the saturable reactor SR is to magnetize and saturate the reactor SR in dependence upon the motor speed so as to increase the reactance of SR at low speeds. Hence, it will be understood that any suitable speed-responsive voltage or current control can be used instead of the illustrated bridge arrangement, although the latter represents a preferred embodiment of this feature of my invention.

A group of relays denoted by R6, R7, R8, R9 and R0 serve to control the resistance of the exterior rotor circuit. Relay R6 has contacts 116 and 216 for short circuiting the resistors 71, 81 and 91 and is actuated by a coil 16 which also operates an auxiliary relay contact 316. Relay R7 has three contacts 117, 217 and 317 for shunting each of resistors 75, 85 and 95 individually when coil 17 of the relay is energized. Relay R7 has also two contacts 417 and 517 for controlling two respective circuits appertaining to a set of timing relays T1, T2 and T3.

Relays R8, R9 and R0 have each two contacts 118 and 218, 119 and 219, 120 and 220, respectively, for shorting corresponding groups of resistors in the armature circuit. Relays R8 and R9 are also provided with contacts 318, 418 and 319, 419 respectively for controlling circuits of the just-mentioned timing relays.

Each time relay T1, T2 and T3 has a main winding 21, 22 and 23, respectively, a short-circuited winding 41, 42 and 43 respectively consisting, for instance, of a single turn copper sleeve for increasing the time constant, and also a neutralizing winding 31, 32 and 33 respectively. The neutralizing windings have a lower number of ampere turns than the corresponding main windings and act in opposition to the main windings. The time relay coils and the return springs of these relays are so dimensioned and adjusted relative to one another that the time delay obtained in each of these relays is longer if only the main magnetizing coil, such as coil 21 of relay T1, is energized than when both this coil and the corresponding neutralizing coil are energized at the same time. The neutralizing coils are not sufficient to actuate the time relays when energized without simultaneous energization of the respective main coils. Due to the above-mentioned connection of the time relay circuits with relays R6 through R9, these time relays control the sequential operation of relays R6 through R9 so as to prevent the resistor relays from being actuated in an unsuitably fast succession.

The main and neutralizing coils of the time relays are energized from the line over a step-down transformer 44, a rectifier bridge 45 and a direct-current circuit 46. The neutralizing coils 31, 32 and 33 are series connected over an adjusting rheostat 47 and relay contact 615 of relay R5. Hence, the neutralizing coils remain provided with excitation as long as relay R5 is energized. The main coils 21, 22 and 23 of the time relays are individually connected to the circuit 46, each connection being controlled by a contact of one of the relays R7, R8 and R9, respectively. Thus main coil 21 of time relay T1 is energized only as long as relay R7 is deenergized and contact 517 closed. Similarly, relays T2 and T3 have their respective main coils energized and keep their contacts 418 and 419 closed only as long as the respective relays R8 and R9 remain inactive.

The proper sequence of operation of the above described elements of the control system is obtained by means of a master controller MC which contains a base member 48, for instance of the drum type, a number of contact segments like those denoted by 50 mounted on the base member, and a group of contact fingers 49 which engage the segments 50 selectively when the master controller is placed in any of the positions indicated by "off," hoist" points 1 through 6 and "lowering" points 1 through 6. The contact fingers 49 are connected with the circuit elements of the system by leads such as those denoted by numerals between 130 and 146.

Figure 2:
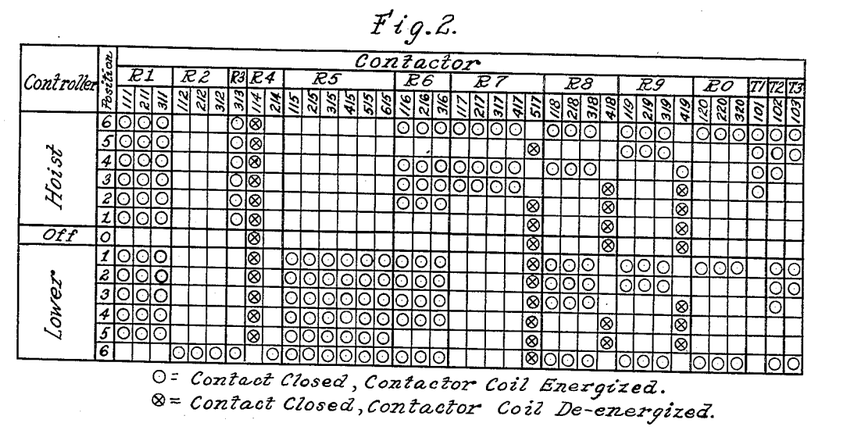
Fig. 2 is a chart showing the sequential operation of the controller, relays and contacts of the system represented by Fig. 1.

The operation of the system and the function of its individual elements will be understood from the following step-by-step description of complete hoisting and lowering operations in conjunction with both the circuit diagram of Fig. 1 and the sequence chart of Fig. 2.

When the master controller MC is in the "off" position, and the master switch MS closed for energizing the system, relays R1 through R9 and R0 are inactive as shown in Fig. 1. The neutralizing coils 31, 32 and 33 of the time relays are not energized because contact 615 remains open while the main coils 21, 22 and 23 are energized and open the contacts 101, 102 and 103 of the time relays.

Hoisting operation

*Controller step 1.*—In this first hoisting position of the master controller, relay R1 is energized from point B of main 2, through coil 11, hoist limit switch HS and the master controller MC connected to point C of main 3. Contacts 111, 211 and 311 close and connect the hoisting motor HM to the line for operation in the hoisting direction. Relay R3 is also energized over point C, MC, 133, 13, 132, and point B and closes contact 313, thereby shorting the saturable reactor SR out of the motor circuit. None of relays R7 through R0 is energized, hence the rotor circuit contains maximum resistance. As a result, the motor operates in three phase characteristic for lowest hoisting acceleration.

*Step 2.*—R6 is energized over MC, 136, 16, 132 and shorts resistors 71, 81, 91 in the rotor circuit, so that the motor is now set for increased acceleration. The closure of relay contact 316 prepares coil 17 of relay R7 for subsequent energization.

*Step 3.*—Relay R7 is energized from MC over 137, 17, 316, 132 and shunts resistors 75, 85 and 95 for the increase in acceleration and torque. Contact 517 of relay R7 opens, and hence causes time relay T1 to close its contact 101 with time delay. After the expiration of the delay period, coil 18 of relay R8 is prepared for operation but remains as yet inactive.

*Step 4.*—Relay R8 is energized from MC, over 138, 18, 101, 417 and 132 shorts resistors 72, 82 and 92 for further acceleration. The closure of contact 318 of relay R8 prepares coil 19 of relay R9 for operation, while the opening of contact 418 cuts off the main coil 22 of time relay T2 and causes the latter to close contact 102 with delay, thus also preparing relay R9 for subsequent operation.

*Step 5.*—Relay R9 comes in over MC, 139, 19, 318, 102, 132 and shorts resistors 73, 83 and 93 while disconnecting coil 23 of time relay T3 at 419. Timing contact 103 is closed with delay for preparing relay R0 for energization.

*Step 6.*—Relay R0 is energized over MC, 130, 20, 319, 103, 132 and shorts resistors 74, 84 and 94 so that the entire resistance of the exterior rotor circuit is eliminated, and the motor energized for maximum torque and speed.

It will be noted that the relay R3 remains energized during all hoisting steps so that the reactor SR is kept ineffective. Consequently, the motor develops three phase-torque during all stages of a hoisting operation.

Lowering operation

The greatest acceleration in the lowering direction is obtained on lowering step 6 of the master controller while a progressive adjustment of the controller through steps 5 through 0 on the lowering side effects a decrease in lowering speed down to zero. Hence a proper way of operation is to pass the master controller from the "off" position quickly into lowering position 6 and then to return to the "off" position. Therefore, this sequence of operation is considered in the following, although the reverse way of operation is also applicable.

*Lowering step 6.*—The coil 12 of lowering relay R2 is energized from point C of main 3, over the lower limit switch LS, MC, 142, 12 and B in parallel to coil 14 of relay R4. That is, the motor is now energized for running under power in the lowering direction. Relay R3 is energized through MC, 133, 13, 132 and hence the reactor SR is shorted so that the motor develops fully three-phase torque. Relay R5 is energized over MC, 140, 214, 145, 15, 132. The control bridge CB is fed from the line over contacts 115 and 215, while contact 415 closes the self-holding circuit of relay R5. As a result, this relay remains energized throughout the following lowering steps and is cut off only when the master controller reaches the "off" position. Relay R6 is energized over MC, 136, 16, 132, B and shorts resistors 71, 81 and 91. Relay R7 is energized over MC, 137, 17, 316, 132, B and shunts resistors 75, 85 and 95. Relay R8 is energized over MC, 138, 18, 515, 316, 132 and shorts resistors 72, 82, 92. Contact 418 opens so that timing contact 102 of T2 is closed. Relay R9 is energized over MC, 139, 19, 318, 102, 132, shorts resistors 73, 83, and 93, and causes through contact 419 the closure of timing contact 103 of relay T3. Relay R0 is energized over MC, 130, 20, 319, 103, 132, shorts resistors 74, 84, and 94. At the same time, the neutralizing windings 31, 32 and 33 of T1, T2, T3 are energized over 615 so that the time delay effective during the lowering operation is smaller than that obtained during the hoisting operation due to the counteracting effect of the neutralizing coils.

The result of the just-mentioned relay adjustments in lowering step 6 of the master controller 6 is that the resistors of the rotor circuit are all shorted while the primary motor circuit is energized in full three-phase operation. Consequently, the motor is actuated for high lowering speed with regenerative braking at overhauling loads.

*Step 5.*—Coil 15 of R5 remains energized over 132 through holding contact 415 and lead 140. Hence the control bridge CB remains fed through 115 and 215. Due to the closure of 114, lead 140 is connected through 415, 145, 114, 315, 146, HS and 11 with point B of main 2 and energizes R1. Hence, due to the action of relay R4, the hoisting relay R1 remains operative as long as R4 is off and R5 on. Relay R3 is disconnected in MC and opens contact 313. The result of these adjustments is to place the full secondary resistance into the rotor circuit and render the saturable reactor effective for operation, the reactance of SR being controlled through bridge CB in dependence upon the motor speed due to the action of the pilot generator PG. Consequently, the motor operates now with a torque characteristic which may be considered as being a biased three phase torque, the bias being towards single torque operation.

*Step 4.*—In lowering step 4 as well as in step 5 and any of steps 3, 2 and 1, the relay R5 remains energized and hence provides for energization of the control bridge CB from the line, while at the same time relay R3 is cut off and hence maintains the reactor SR effective. The only change as regards the relay adjustments in step 4 as compared with preceding step 5 is that relay R6 becomes also energized through MC 136, 16, 132 and shorts 71, 81 and 91, the motor torque in any of steps 5 through 1 being in opposition to the load torque during the lower operation.

*Step 3.*—In addition to the foregoing adjustments R8 is energized through MC, 138, 18, 515, 316, 132 and shorts resistors 72, 82 and 92. The opening of contact 418 causes time relay T2 to close its contact 102 with delay in order to prepare a circuit for coil 19 over contact 318.

*Step 2.*—Relay R9 comes in over MC, 139, 19, 318, 102, 132 and shorts 73, 83 and 93. The opening of contact 419 causes relay T3 to close contact 103 with delay, thus preparing a circuit for coil 20 of step 1. R0 comes in over MC, 130, 20, 319, 103, 132 and shorts 74, 84, 94. Hence only resistors 75, 85 and 95 remain in the rotor circuit.

During the progressive adjustment of the master controller from step 6 through step 1 for lowering, the countertorque developed by the motor effects a deceleration of the lowering speed and hence a corresponding change in the voltage supplied by the pilot generator PG to the control bridge CB. Consequently, the reactance of the saturable reactor SR is gradually increased, the torque characteristic of the motor is changed from approximate multiphase operation at high lowering speed to virtual single-phase operation at zero speed.

Figure 3:
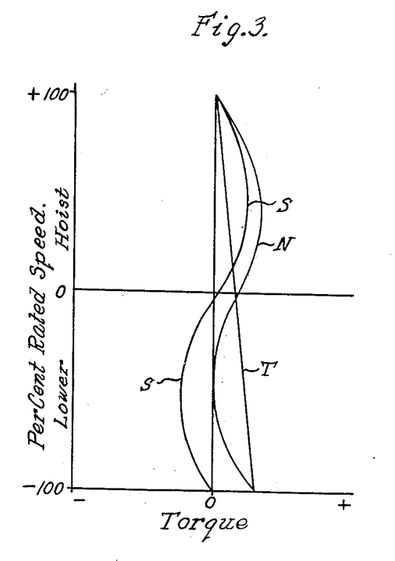
Figure 4:
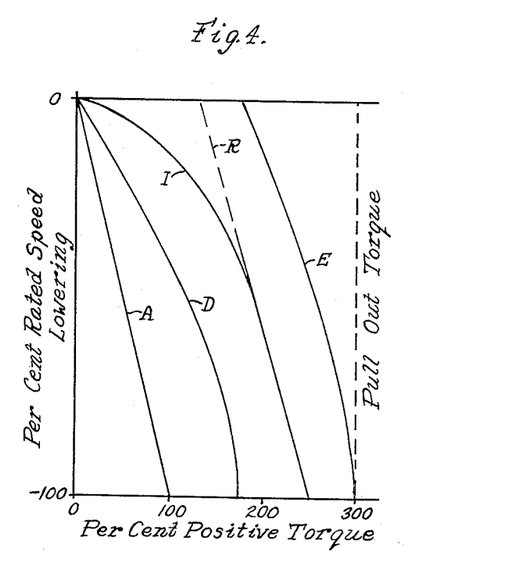
Figure 5:
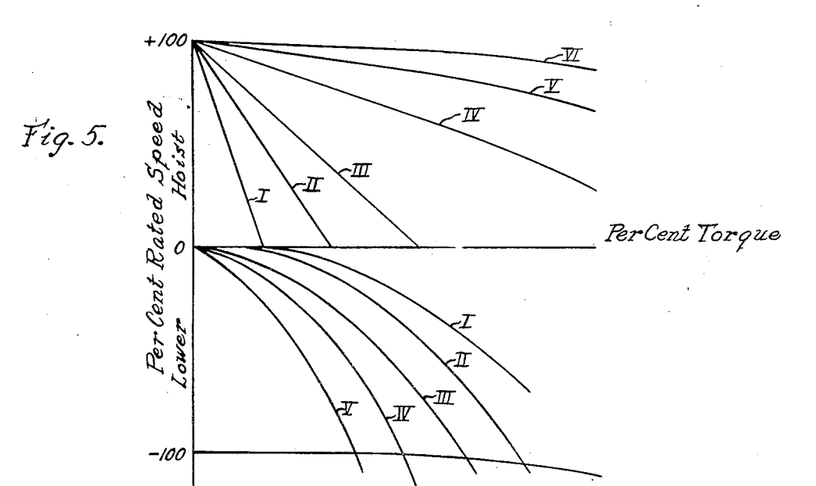

The operation of the control system will be more fully understood from a consideration of the speed torque diagrams shown in Figs. 3, 4 and 5.

Fig. 3 represents schematically a single-phase characteristic denoted by S, and a three-phase characteristic denoted by T. The single-phase torque is zero at 100% positive speed (hoisting), at 100% negative speed (lowering) and at zero speed, while the three phase torque T is zero at 100% positive speed, has a maximum at 100% negative speed, and pass through an intermediate value at zero speed. S and T are cumulative in the range of positive speeds and subtractive in the negative speed range so that the hypothetical net torque obtained by superposition of single phase and three-phase torque would be represented by curve N.

The above described control system utilizes the subtractive effect prevailing at negative speeds and, by virtue of the controlled reactor operation, energizes the motor in approximate or full three-phase operation at speeds near 100% negative speed. Consequently, at these high lowering speeds the motor characteristic is similar to the three-phase characteristic T. At lower negative speeds approaching the zero value, the increasing reactance of the control reactor biases the three-phase torque towards the single-phase characteristic and results in a net torque which approaches zero at zero speed.

This result is apparent from curves I and R in the diagram of Fig. 4 showing only the torque conditions within the negative speed range. The broken line R represents the torque obtained when the reactor is fully saturated and approaches the three-phase torque condition represented by the negative portion of curve T in Fig. 3. At low and declining speeds, the effect of the progressing desaturation of the reactor and the consequential increase in reactance distorts the original characteristic so as to bend it towards the zero point which is reached or substantially reached at zero speed, as represented by the full line curve I. Consequently, curve I in Fig. 4 is the prototype of a torque-speed characteristic as obtained at lower operation with a system according to the present invention when the saturable reactor and its appertaining control means are effective, for instance as in steps 1 through 5 of the lowering operation according to the embodiment represented by Figs. 1 and 2.

For comparison, curve A in Fig. 4 represents the characteristic of an alternating-current excited dynamic braking operation and curve D the characteristic obtained with a direct-current excited dynamic braking operation. While these characteristics achieve zero torque at zero speed, the maximum torque at 100% lowering speed is relatively low. Curve E exemplifies the countertorque method. While this method permits reaching a maximum torque up to the pullout value it retains a considerable torque at zero speed. In contrast thereto, the speed torque characteristic I representative of the invention combines the advantages of vanishing torque at zero speed with a high maximum torque. Since it is possible to eliminate the reactor entirely in the highest speed step of the lowering operation, as is described in connection with Figs. 1 and 2, a system according to the invention permits also the application of maximum countertorque up to the pull-out value when the operating conditions adjusted by the master controller are such that a torque of this magnitude is desirable, i. e. when relay R3 closes its contact 113. As a result, the invention permits in fact achieving the advantages of the above-mentioned known systems while avoiding their disadvantages.

Fig. 5 is an example of a complete speed torque diagram for hoisting and lowering speeds as obtainable in a system according to Fig. 1. The curves on the hoisting side of the diagram marked I through VI correspond to the characteristics obtained with the respective hoisting steps 1 through 6 of the master controller, as indicated in Figs. 1 and 2. As previously stated, these hoisting characteristics are three-phase characteristics and not different from those obtained in other three-phase systems. The curves marked I through VI on the lowering side of the diagram refer to the corresponding lowering positions 1 through 6 of the master controller as indicated in Figs. 1 and 2. Curves I through V for negative speeds are in accordance with the typical curve I in Fig. 4, while curve VI for negative speeds in Fig. 5 exemplifies one possible way of regenerative operation obtained with the saturable reactor SR shorted at full multiphase operation.

As mentioned when describing the control bridge CB shown in Fig. 1, the control of the saturable reactor may be modified in different ways without departing from the objects and scope of my invention. In order to elucidate this possibility of modification, reference is made to the embodiments illustrated in Figs. 6, 7 and 8.

Figure 6:
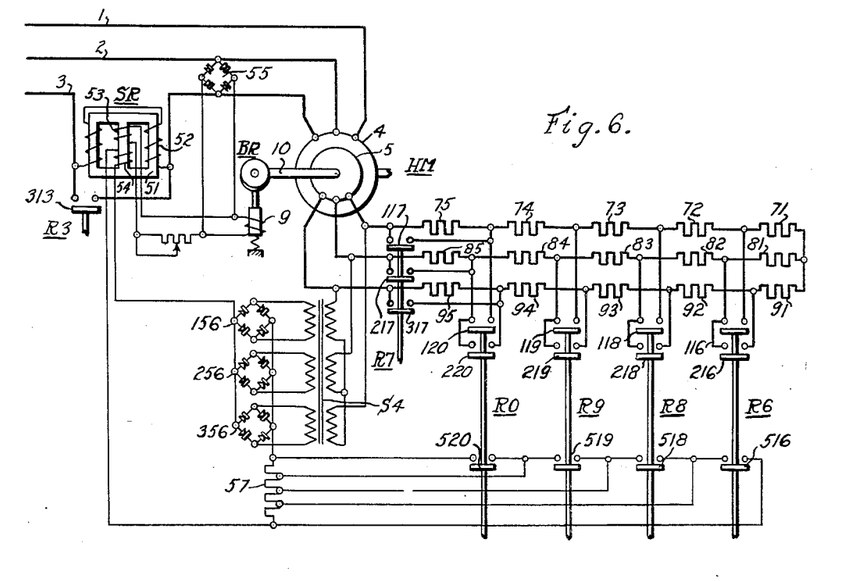
Figs. 6, 7 and 8 illustrate the respective circuit diagrams of three other embodiments of hoist controls according to the invention.

Fig. 6 shows only part of a hoist control system, the not illustrated portion being similar to, or identical with, the corresponding elements shown in Fig. 1. The same reference numerals are used in Fig. 1 and Fig. 6 for elements of similar arrangement and function.

The hoisting motor HM according to Fig. 6 is connected to the mains 1, 2, 3 of an alternating-current line and controlled by a group of relays all connected to a common master controller in the same manner as apparent from Fig. 1. The essential difference between the systems of Figs. 1 and 6 concerns the control of the saturable reactor SR. While a pilot generator is used in the system of Fig. 1 for obtaining a speed responsive control, a similar effect is achieved in the system of Fig. 6 without a pilot generator by connecting the premagnetizing coil 53 of the reactor SR to the exterior rotor circuit of the hoisting motor over a transformer S4 and a set of rectifier bridges 156, 256 and 356. A second premagnetizing coil 54 is arranged on the transformer core 51 and connected to the line through a rectifier bridge 55. The control coils 53 and 54 act in opposition so that the resultant magnetization of the reactor depends on their differential effect. The excitation of coil 54 is adjustable by means of a rheostat 54' and remains fixed during the operation of the system. A resistor 57 is series connected in the circuit of control coil 53 and has a number of taps connected to additional contacts 516, 518, 519 and 520 of the secondary relays R6, R8, R9 and R0 respectively. These contacts are closed when the respective relays are energized and have the effect of shunting the appertaining section of resistor 57. As a result, the premagnetization of the saturable reactor and its resultant reactance are dependent on two component control effects. One effect is given by the output voltage of rectifier sets 156, 256 and 356 which is inversely proportional to the motor speed. The other component control effect is dependent on the actuation of the secondary relays and the amount of resistance effective at 57. As a result, the change of reactance shows the desired dependence on the motor speed and can be biased so as to have a sufficiently high value at high motor speeds and a desirable minimum value at low motor speeds. In other words, this control system combines an automatic speed control governed by the motor speed with a manual control governed by the adjustment of the master controller.

Figure 7:
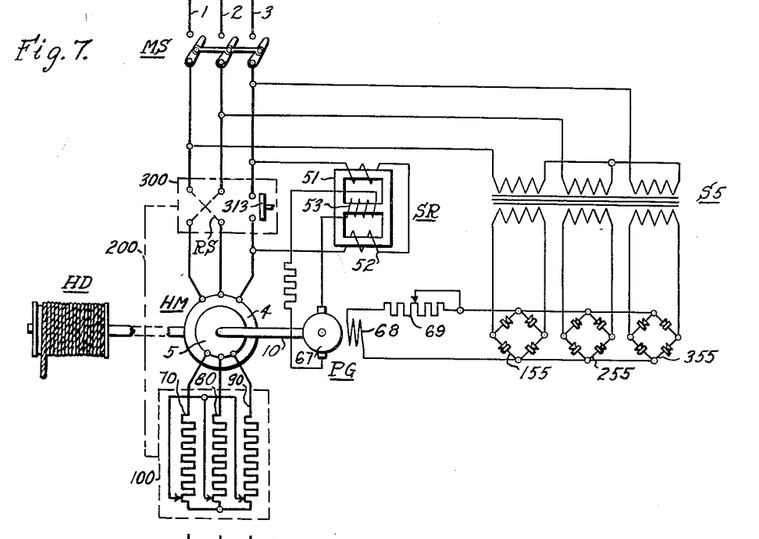

A third way of controlling the reactance of the saturable reactor in dependence on the speed of the hoist motor is exemplified by Fig. 7. This figure shows a simplified circuit diagram containing only the elements required for the reactor-controlled operation, while the interconnection of these elements, actually obtained by relays and master control means of the type shown in Fig. 1, is denoted schematically by the dot-and-dash line 200 connecting the contact means enclosed by the broken line 300 with the resistance control means enclosed by the broken line 100. The hoist motor HM, whose shaft 10 drives the hoist drum HD and the armature 67 of a pilot generator PG, is fed from mains 1, 2 and 3 over a master switch MS. Reversing contact means corresponding to relays R1 and R2 in Fig. 1 are schematically indicated by RS. A saturable reactor SR has its alternating-current coil 52 inserted between the motor and main 3 and can be short-circuited by means of a contact 313 which corresponds to contact 313 in Fig. 1. The three-phase connections 70 and 90 of the rotor circuit contain controllable resistors for dynamic braking. The reversing means RS, the contact 313 and the resistance control means symbolized by box 100 are interconnected by master control means so as to operate in the necessary sequence, for instance that inherent in the control scheme of Fig. 2.

The essential difference between the system of Figs. 1 and 7 consists in the fact that the control coil 53 of the saturable reactor in Fig. 7 is energized directly from a pilot generator PG under omission of a control bridge of the type represented by CB in Fig. 1. The field winding 68 of the pilot generator according to Fig. 7 is energized over an adjusting rheostat from a group of rectifier bridges 155, 255, 355 which are energized from the line through a transformer S5. The energization of the pilot field is constant during the operation of the system so that the output voltage of the pilot generator is a measure of its armature speed, and hence of the speed of the hoist motor. At low motor speeds, the voltage in coil 53 is also low and the resultant reactance of the saturable reactor accordingly high so that the system operates with predominant single phase characteristic tending to develop vanishing torque at zero speed.

Figure 8:
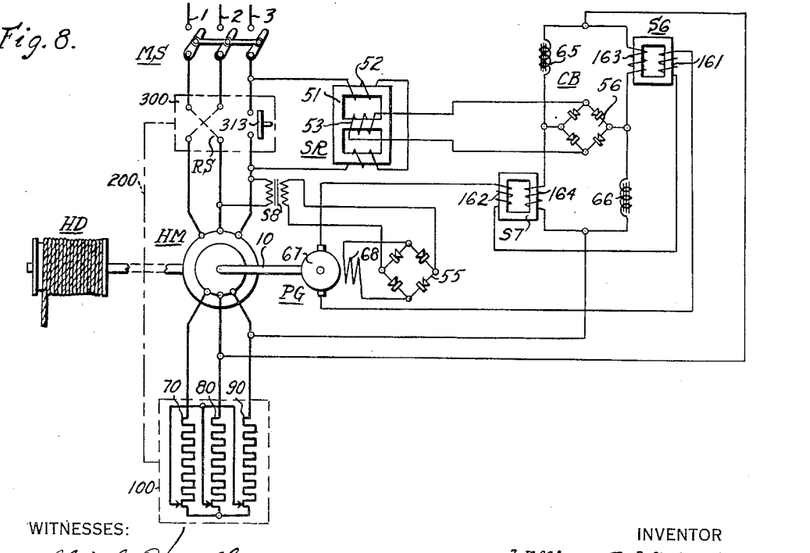

The system represented by Fig. 8 is illustrated in a manner similar to that employed in Fig. 7 and is closely similar to that of Fig. 1, as will be apparent from the coinciding reference numerals used in Figs. 1 and 8 for indicating similar elements. An essential difference, however, lies in the fact that while the control bridge CB according to Fig. 1 is provided with constant energization from the primary alternating-current line, the corresponding control bridge CB according to Fig. 8 is energized from conductors 80 and 90 of the rotor circuit. The control bridge CB contains two saturable reactors S6 and S7 having each a reactor coil 163 or 164 and a control coil 161 and 162, respectively. The direct-current output voltage of bridge CB is determined by two variable control magnitudes. One magnitude is the secondary rotor voltage supplied to the bridge. This voltage varies with the speed of the hoisting motor HM and declines at increasing motor speeds. The other control magnitude is the voltage of the pilot generator PG supplied to reactor coils 161 and 162. The field winding 68 of the generator PG is energized by a rectifier arrangement 55 which is fed through a transformer 58 from the line. Hence, the generator excitation remains constant during the operation of the system. Consequently, the pilot voltage of PG is also a measure of the motor speed. Since both control magnitudes of the bridge CB are thus responsive to variations in the motor speed, the control effect imposed on the saturable reactor SR is enhanced to high sensitivity, a condition which is desirable in certain fields of application.

The speed torque characteristics obtained in each of the systems shown in Figs. 6, 7 and 8 when the saturable reactor is effective in the energizing circuit of the hoist motor and controlled as described in the foregoing, resembles as to its general type the curve I in Fig. 4, and hence affords the basic operation and advantages of the invention as set forth previously.

Another advantage of hoist control systems according to the invention is the fact that the graduated regulation between multiphase (low speed high torque) lowering characteristic and approximate single phase (low speed low torque) lowering characteristic can be obtained without changing the internal connections of the hoist motor. That is, a standard hoist motor having its primaries permanently connected with each other, for instance, in delta or star connection, can be employed since the variation between these characteristics is achieved merely by means connected to the externally accessible terminal of the motor windings i. e. by varying the distribution or balance condition of the phase voltages and currents. It will be obvious to those skilled in the art that while I have exemplified my invention by embodiments containing a variable inductance device in only one phase of the multiphase primary motor circuit, the just mentioned conditions may also be obtained by arranging the inductance means so that they affect also another phase, though preferably a lesser number of phases than the available total, as long as these means are designed to achieve the selective and graduated voltage distribution to the primaries over a range including multiphase and approximate single phase or low-speed low-torque operation as explained in the foregoing.

In view of the fact that various modifications of my invention are available to those skilled in this art, it is intended that the foregoing description be considered as illustrative and not in a limiting sense.

I claim as my invention:

1. A hoist control system comprising an alternating-current hoist motor, selective three-phase circuit means for energizing said motor to effect hoisting and lowering operations, a saturable reactor having an alternating-current winding connected in one phase of said circuit means and a control winding for varying the reactance of said alternating-current winding, means for controlling said reactor to operate at low-speed overhauling lowering operation of said motor, and speed responsive regulating means connected to said control winding for increasing said reactance at decreasing lowering speeds so as to provide for approximate single-phase energization at low lowering speeds and for substantially balanced three-phase energization at high lowering speeds.

2. A hoist control system comprising a wound rotor hoist motor, multiphase alternating-current circuit means for energizing said motor to effect hoisting and lowering operations, variable impedance means connected between said circuit means and said motor for controlling the torque characteristic of said motor, and means for controlling said impedance means to increase its impedance at decreasing lowering speeds of said motor, said motor having a rotor circuit connected to said control means for varying said impedance means in dependence upon the motor speed so as to provide for approximate single-phase energization at low lowering speeds and for substantially balanced three-phase energization at high lowering speeds.

3. A hoist control system comprising a wound rotor hoist motor, three-phase circuit means for energizing said motor to effect hoisting and lowering operations, a saturable reactor having an alternating-current winding connected in one phase of said circuit means and a control winding for varying the reactance of said alternating-current winding, said motor having a rotor circuit connected to said control winding for controlling said reactance in dependence upon the motor speed so as to provide for substantially single-phase operation at low lowering speeds and for three-phase operation at higher lowering speeds.

4. A hoist control system comprising an alternating-current hoist motor, selective three-phase circuit means for energizing said motor to effect hoisting and lowering operations, a saturable reactor having an alternating-current winding connected in one phase of said circuit means and a control winding for varying the reactance of said alternating-current winding, means for controlling said reactor to operate at low-speed lowering operation of said motor, and a pilot generator mechanically connected with said motor for providing a variable voltage in dependence upon the motor speed and electrically connected to said control winding for increasing said reactance at decreasing lowering speeds so as to provide substantially single-phase operation at low lowering speeds and three-phase operation at higher lowering speeds.

5. A hoist control system comprising an alternating-current hoist motor, selective three-phase circuit means for energizing said motor to effect hoisting and lowering operations, a saturable reactor having an alternating-current winding connected in one phase of said circuit means and a control winding for varying the reactance of said alternating-current winding, means controlled by said selective circuit means for rendering said reactor effective at low-speed lowering operation of said motor, and a speed-responsive direct-current source connected between said motor and said control winding for causing the latter to increase said reactance at decreasing lowering speeds so as to provide approximately single-phase energization at low lowering speeds and substantially balanced three-phase energization at high lowering speeds.

6. A hoist control system comprising an alternating-current hoist motor, selective three-phase circuit means for energizing said motor to effect a hoisting and lowering operation, a saturable reactor having an alternating-current winding connected in one phase of said circuit means and a control winding for varying the reactance of said alternating-current winding, means controlled by said selective circuit means for rendering said reactor effective at low-speed lowering operation of said motor, an adjustable alternating-current bridge having a diagonal-connected output branch, rectifier means disposed between said branch and said control winding to energize the latter in accordance with the diagonal output voltage, and means responsive to the motor speed for controlling the adjustment of said bridge in order to vary said output voltage, whereby said control winding is caused to increase said reactance at decreasing lowering speeds.

7. A hoist control system comprising an alternating-current hoist motor, selective three-phase circuit means for energizing said motor to effect hoisting and lowering operations, a saturable reactor having an alternating-current winding connected in one phase of said circuit means and a control winding for varying the reactance of said alternating-current winding, means controlled by said selective circuit means for rendering said reactor effective at low-speed lowering operation of said motor, a bridge network having a variable impedance branch and an output diagonal, current supply means controlled by said circuit means and disposed for feeding said network with alternating current, rectifier means connected between said diagonal and said control coil to energize the latter with direct current, and means responsive to the motor speed for controlling said impedance branch in order to vary said direct current whereby said reactance is increased at decreasing lowering speeds.

8. A hoist control system comprising an alternating-current hoist motor, selective three-phase circuit means for energizing said motor to effect hoisting and lowering operations, a saturable reactor having an alternating-current winding connected in one phase of said circuit means and a control winding for varying the reactance of said alternating-current winding, means controlled by said selective circuit means for rendering said reactor effective at low-speed lowering operation of said motor, an alternating-current bridge having a variable impedance branch and an output diagonal, rectifier means connected between said diagonal and said control coil to energize the latter with direct current, and a pilot generator mechanically connected with said motor to provide a voltage in dependence upon the motor speed and electrically connected to said impedance branch for varying the latter in order to control said direct current accordingly, whereby said reactance is increased at decreasing lowering speeds for providing greatly unbalancing the motor energization at zero speed and providing substantially balanced energization at high lowering speeds of said motor.

9. A hoist control system comprising an alternating-current hoist motor, selective three-phase circuit means for energizing said motor to effect a hoisting and lowering operation, a saturable reactor having an alternating-current winding connected in one phase of said circuit means and a control winding for varying the reactance of said alternating-current winding, means controlled by said selective circuit means for rendering said reactor effective at low-speed lowering operation of said motor, a bridge network having a variable impedance branch and an output diagonal, rectifier means connected between said diagonal and said control coil to energize the latter with direct current, means for feeding said network with current of substantially constant voltage, and means responsive to the motor speed for controlling said impedance branch in order to vary said direct current whereby said reactance is increased at decreasing lowering speeds.

10. A hoist control system comprising a wound rotor hoist motor, multiphase alternating-current circuit means for energizing said motor to effect hoisting and lowering operations, a saturable reactor for controlling the torque characteristic of said motor having an alternating-current winding connected in one phase of said circuit means and containing a control winding for varying the reactance of said alternating-current winding, rectifier means connected to said control winding to supply it with direct current, said motor having a rotor circuit connected to said rectifier means for energizing them in accordance with the motor speed so as to increase said reactance with decreasing speed, and control means for rendering said reactor effective at low lowering speeds and ineffective at other speeds.

11. A hoist control system comprising a wound rotor hoist motor, three phase alternating-current supply means for energizing said motor to effect hoisting and lowering operations, a saturable reactor disposed for controlling the torque characteristic of said motor and having a reactance winding connected in one phase of said circuit means and a control winding for varying the reactance of said alternating-current winding, said motor having a rotor circuit provided with resistors for speed control, contactor means for controlling said resistors and said reactor so as to render said reactor effective at low lowering speeds and ineffective at hoisting and high lowering speeds, and a speed-responsive current source connected to said control winding for causing it to increase said reactance with decreasing lowering speeds, whereby said motor is controlled to operate with approximately single-phase energization at low-speed lowering and with three-phase energization at higher lowering speeds.

12. A hoist control system comprising a wound rotor hoist motor, three phase alternating-current supply means for energizing said motor to effect hoisting and lowering operations, a saturable reactor disposed for controlling the torque characteristic of said motor and having a reactance winding connected on one phase of said circuit means and a control winding for varying the reactance of said alternating-current winding, said motor having a rotor circuit provided with resistors for speed control, contactor means for controlling said resistors and said reactor so as to render said reactor effective at low overhauling lowering speeds and ineffective at hoisting and high lowering speeds, and a pilot generator driven by said motor and connected to said control winding to energize it in accordance with the motor speed, whereby said motor is controlled to operate with substantially single-phase energization at low-speed overhauling lowering and with three-phase energization at high-speed lowering.

13. A hoist control system comprising a wound rotor hoist motor, three phase alternating-current supply means for energizing said motor to effect hoisting and lowering operations, a saturable reactor disposed for controlling the torque characteristic of said motor and having a reactance winding connected on one phase of said circuit means and a control winding for varying the reactance of said alternating-current winding, said motor having a rotor circuit provided with resistors for speed control, contactor means for controlling said resistors and said reactor so as to render said reactor effective at low lowering speeds and ineffective at hoisting and high lowering speeds, and rectifier means connected between said rotor circuit and said control winding for energizing the latter in dependence upon the motor speed so as to increase said reactance with decreasing speeds.

14. A hoist control system comprising, in combination, a three-phase wound-rotor hoist motor having standard connected primaries and a secondary resistance circuit, a three-phase circuit connected to said primaries externally of said motor and containing variable circuit means for unbalancing the voltage distribution of said primaries by varying the voltage of at least one of said primaries between two values corresponding to approximate single phase distribution and approximately balanced multiphase distribution respectively, control means for externally of said circuit means substantially in accordance with the speed of said motor so as to obtain increased voltage unbalance at decreasing speed, and an operator-actuable controller for stepwise controlling said secondary circuit, said controller having a position in which said control means are operative and other positions in which the resistance of said secondary circuit is varied between given values while said control means are ineffective so that said voltage distribution is balanced.

15. A motor control system, comprising an alternating current motor, multiphase current supply means therefor, adjustable circuit means disposed between said supply means and said motor for varying the balance condition of the motor voltage, a pilot generator connected with said motor for generating a control voltage in accordance with the motor speed, and control means controlled by said voltage and connected to said circuit means for causing them to unbalance said primary voltage in a degree increasing with decreasing motor speed.

16. A motor control system comprising an alternating current motor, multiphase current supply means therefor, saturable reactor means disposed between said supply means and said motor for varying the balance condition of the motor voltage, said reactor means having a control winding, a pilot generator connected with said motor for generating a control voltage in accordance with the motor speed, and control means controlled by said voltage and connected to said winding for causing it to vary the reactance of said reactor means in order to unbalance said primary voltages in a degree increasing with decreasing motor speed.

17. A motor control system, comprising an alternating current motor, multiphase current supply means therefor, adjustable circuit means disposed between said supply means and said motor for varying the balance condition of the motor voltage, a means connected with said motor for providing a control voltage varying in dependence upon the motor speed, an amplifying bridge network having an output circuit connected to said circuit means for controlling the latter and being controlled by said control voltage in order to cause said circuit means to unbalance said motor voltage in response to changes in motor speed.

18. A motor control system comprising an alternating current motor, multiphase current supply means therefor, saturable reactor means disposed between said supply means and said motor for varying the balance condition of the motor voltage, said reactor means having a control winding, a means connected with said motor for providing a control voltage varying in dependence upon the motor speed, an amplifying bridge network having an output circuit connected to said control winding and being controlled by said control voltage in order to cause said reactor means to unbalance said motor voltage in response to changes in motor speed.

19. A hoist control system comprising an alternating current multiphase hoist motor, multiphase current supply means therefor, variable inductance means disposed between said supply means and said motor for controlling the balance condition of the multiphase voltage of said motor, operator-actuable selective control means connected with said inductance means for rendering them operative and inoperative, and means for controlling said inductance means substantially in accordance with the speed of said motor for causing them, when operative, to unbalance said voltage in a degree depending on said speed.

20. A motor control system, comprising an alternating current multiphase motor, multiphase alternating current supply means therefor, adjustable circuit means disposed between said supply means and said motor for varying the balance condition of the primary motor voltage, and control means disposed between said motor and said circuit means for causing the said circuit means to unbalance the multiphase primary voltage of said motor substantially in accordance with the motor speed.

21. A motor control system, comprising an alternating current multiphase motor, multiphase alternating current supply means therefor, adjustable circuit means disposed between said supply means and said motor, for controlling the balance condition of the primary motor voltage and a variable voltage source controlled by said motor and connected with said circuit means for causing the latter to unbalance the multiphase voltage of said motor in a degree varying substantially in accordance with the motor speed.

22. A hoist control system comprising an alternating current multiphase hoist motor, multiphase current supply means therefor, saturable reactor means disposed between said supply means and said motor and having premagnetizing windings for controlling said reactor means so as to unbalance the multiphase voltage of said motor, and energizing means responsive to the speed of said motor for controlling the energization of said coils.

23. A hoist control system comprising an alternating current multiphase hoist motor, multiphase current supply means therefor, saturable reactor means disposed between said supply means and said motor and having premagnetizing windings for controlling said reactor means so as to unbalance the multiphase voltage of said motor, and a pilot generator connected with said motor for controlling the energization of said coils so as to obtain an unbalanced voltage at overhauling lowering operation of said motor.

WILLIAM R. WICKERHAM.